US012572643B2

(12) United States Patent
Veshchikov

(10) Patent No.: US 12,572,643 B2
(45) Date of Patent: Mar. 10, 2026

(54) CIRCUIT AND METHOD FOR DETECTING A FAULT INJECTION ATTACK IN AN INTEGRATED CIRCUIT

(71) Applicant: NXP B.V., Eindhoven (NL)

(72) Inventor: Nikita Veshchikov, Brussels (BE)

(73) Assignee: NXP B.V., Eindhoven (NL)

( * ) Notice: Subject to any disclaimer, the term of this patent is extended or adjusted under 35 U.S.C. 154(b) by 259 days.

(21) Appl. No.: 17/821,285

(22) Filed: Aug. 22, 2022

(65) Prior Publication Data

US 2024/0061926 A1 Feb. 22, 2024

(51) Int. Cl.
*G06F 21/52* (2013.01)
*G06F 21/71* (2013.01)

(52) U.S. Cl.
CPC .............. *G06F 21/52* (2013.01); *G06F 21/71* (2013.01); *G06F 2221/034* (2013.01)

(58) Field of Classification Search
CPC .... G06F 21/52; G06F 21/71; G06F 2221/034; G06F 21/755; G06F 21/51; G06F 21/72; G06F 21/76; G01R 31/2851; G01R 31/2836

See application file for complete search history.

(56) References Cited

U.S. PATENT DOCUMENTS 5,809,109 A 9/1998 Moyal et al.
6,175,257 B1 * 1/2001 Ramanadin ........... G06F 9/3879
712/E9.067

7,489,138 B2 2/2009 Yu et al.
7,694,156 B2 4/2010 Gammel et al.
8,352,752 B2 1/2013 Croguennec et al.
8,442,216 B2 5/2013 Lambert et al.
8,720,600 B2 5/2014 Teglia
8,781,114 B2 7/2014 Gammel et al.
(Continued)

FOREIGN PATENT DOCUMENTS

EP 0450806 A2 10/1991
EP 2620890 A1 7/2013
(Continued)

OTHER PUBLICATIONS

Bock, Peter et al.; "Signal Propagation in Long Wire Chambers"; Published by IOP Publishing for Sissa Medialab; Published Sep. 5, 2012; DOI: 10.1088/1748-0221/7/09/P09003.
(Continued)

*Primary Examiner* — Judy Bazna

(57) ABSTRACT

A fault detection circuit includes a plurality of conductors, a plurality of logic gates coupled to the conductors, a storage circuit, and a checker circuit. The conductors are arranged in parallel. Each logic gate is coupled to a first end of each conductor. The storage circuit is coupled to a second end of each conductor. The checker circuit is coupled to the storage circuit. A known initial bit pattern is provided to an input of the logic gates, and an output of the logic gates is provided to the storage circuit via the conductors. The checker circuit determines if the output of the logic gates stored in the storage circuit is an expected result. If the output is not the expected result, then the checker circuit provides an indication that a fault injection attack is occurring. In another embodiment, a method for detecting a fault injection attack is provided.

19 Claims, 11 Drawing Sheets

(56)                References Cited

U.S. PATENT DOCUMENTS

| 9,118,482 | B2 | 8/2015 | Ghosh | |
| 9,544,132 | B2 | 1/2017 | Salgado et al. | |
| 10,673,610 | B2 | 6/2020 | Vigilant et al. | |
| 10,678,927 | B2 | 6/2020 | Srinivas et al. | |
| 2005/0240842 | A1* | 10/2005 | Yonaga | G01R 31/31723 |
| | | | | 714/724 |
| 2008/0002513 | A1* | 1/2008 | Thompson | G06F 11/106 |
| | | | | 365/201 |
| 2010/0031064 | A1* | 2/2010 | Walmsley | G06F 21/31 |
| | | | | 713/194 |
| 2012/0023389 | A1* | 1/2012 | Brewerton | G06F 11/1641 |
| | | | | 714/E11.016 |
| 2012/0023580 | A1* | 1/2012 | Bancel | G06F 21/79 |
| | | | | 726/23 |
| 2012/0120705 | A1* | 5/2012 | Mitsubori | G11C 29/025 |
| | | | | 365/72 |
| 2014/0149802 | A1* | 5/2014 | Hughes | G06F 9/30038 |
| | | | | 714/47.1 |
| 2015/0092941 | A1 | 4/2015 | Ghosh | |
| 2019/0221972 | A1* | 7/2019 | Hou | H01R 13/6585 |
| 2019/0303566 | A1* | 10/2019 | Yoshimura | G06F 21/552 |
| 2020/0402929 | A1 | 12/2020 | Lentz et al. | |
| 2021/0004461 | A1 | 1/2021 | Guilley et al. | |
| 2022/0317901 | A1* | 10/2022 | Nicholson | G11C 16/10 |

FOREIGN PATENT DOCUMENTS

| EP | 3584737 | A1 | 12/2019 |
| JP | 4053695 | B2 | 2/2008 |
| WO | 2019243299 | A1 | 12/2019 |

OTHER PUBLICATIONS

Veendrick, Harry; "Nanometer CMOS ICs; From Basics to ASICs;" 2017 Edition; pp. 452-455.

* cited by examiner

CIRCUIT AND METHOD FOR DETECTING A FAULT INJECTION ATTACK IN AN INTEGRATED CIRCUIT

BACKGROUND

Field

This disclosure generally relates to electronic circuits, and more particularly, to a circuit and method for detecting a fault injection attack in an integrated circuit (IC).

Related Art

There exist many different types of attacks against cryptographic devices and integrated circuits in general. One of type of attack is a fault injection (FI) attack. The goal of an FI attack is to change the normal behavior of the device while the device is performing its function by inducing a fault in the device. As a result of a fault injection attack, the device might skip one or several instructions, execute a different instruction instead of the one that is in memory, use wrong data, or have one or several bits changed in memory. Because of the fault the device may skip some security checks during a secure boot or authentication process. The device may also deliver wrong results of a computation that can be used to break its security, e.g., extract cryptographic keys or passwords from its memory.

There are many ways to induce a fault in a device such as a microcontroller. For example, X-rays, lasers, strong strobes from a photography camera, electro-magnetic pulses, sudden changes in clock frequency or supply voltage may be used to inject a fault into a device. For an attacker, less expensive FI attacks are attacks that change the clock frequency or supply voltage. For example, the attacker may cause a sudden increase in the clock frequency that does not give the device enough time to properly execute the current instruction. Also, suddenly lowering a supply voltage supplied to the device may not allow the device enough power to execute an instruction correctly. Likewise, too high of a voltage supplied for a short period of time may induce an error in the computation. Changing the clock frequency or supply voltage may affect operation of the entire device as opposed to, e.g., a laser fault injection, which only affects a small carefully chosen part of the device. These types of attacks are sometimes referred to as "glitch" attacks.

When a fault injection attack is detected in the device, various actions may be taken to protect the device, such as performing the affected computation again or running a procedure to recover the device to a normal state, e.g., reboot, restart, or reset the device.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
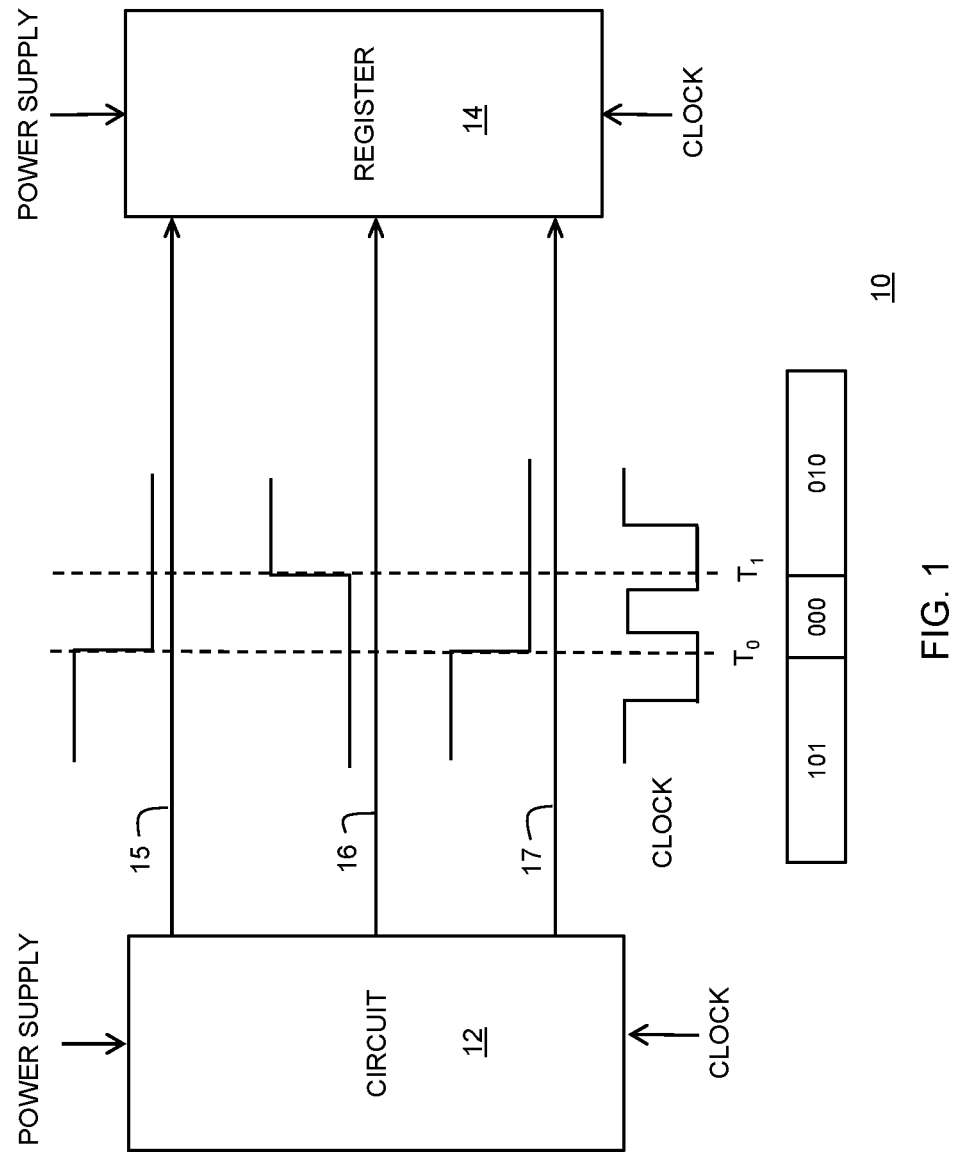
FIG. 1 illustrates a fault injection on a bus having three conductors on a portion of an integrated circuit (IC).

Generally, there is provided, a fault detection circuit that detects a fault injection attack that reduces a power supply voltage or inserts a glitch or extra clock cycle into a clock signal of the device. The fault detection circuit provides a relatively simple method and hardware circuit to determine if a fault injection attack is occurring based on signal transition delay caused by capacitive coupling, or crosstalk, between multiple parallel conductors. In the fault detection circuit, a bit pattern is conducted over a plurality of parallel conductors that are relatively closely spaced from each other to induce a capacitive coupling between the conductors. The capacitive coupling between the conductors may cause delay to be introduced in the conducted bit pattern causing the bits to transition from one logic state to another logic state at different times. The fault detection circuit includes a loop, and the bit pattern is inverted on every pass through the loop. On each pass, the bit pattern is captured in a register in response to a clock. An injected fault in the device, such as a lowered supply voltage or increased clock frequency may result in the bit pattern being captured by a wrong clock edge while the bits are still changing logic states. A checker circuit of the fault detection circuit detects if the wrong bits were captured indicating a possible fault injection attack.

In accordance with an embodiment, there is provided, a fault detection circuit in an integrated circuit, the fault detection circuit including: a plurality of conductors arranged in parallel, each conductor of the plurality of conductors having a first end and a second end; a plurality of logic gates, each logic gate coupled to the first end of each conductor of the plurality of conductors; a storage circuit coupled to the second end of each conductor of the plurality of conductors; and a checker circuit coupled to the storage circuit, wherein a known initial bit pattern is provided to an input of the plurality of logic gates, wherein an output of the plurality of logic gates is provided to the storage circuit via the plurality of conductors, wherein the checker circuit determines if the output of the plurality of logic gates stored in the storage circuit is an expected result, and wherein if the output is not the expected result, then the checker circuit provides an indication that a fault injection attack is occurring. The storage circuit may be a register. The storage circuit may store the output of the plurality of logic gates in response to a clock signal. The plurality of logic gates may be inverters. Each logic gate of the plurality of logic gates may be configurable inverters. The known initial bit pattern may be provided only once at startup of the integrated circuit. The checker circuit may further include an exclusive-OR (XOR) logic gate for performing a bitwise XOR of each bit stored in the storage circuit with each bit of the known initial bit pattern, wherein an output of the XOR logic gate may be compared to the expected result, and wherein if the output of the XOR logic gate is not equal to the expected result, the checker circuit providing the indication. The checker circuit may further include an exclusive-OR (XOR) logic gate for receiving a first input comprising a first comparison result of the known initial bit pattern with the output of the plurality of logic gates and a second input comprising a second comparison result of an inverse of the initial known bit pattern with the output of the plurality of logic gates, and wherein an output of the XOR logic gate is compared to the expected result to determine if the fault injection attack is occurring. The fault injection may include one or both of an increased clock frequency and a reduced power supply voltage. The fault detection circuit may be part of an integrated circuit.

In another embodiment, there is provided, an integrated circuit, including: circuitry for performing a function; and a fault detection circuit including: a plurality of conductors arranged in parallel, each conductor of the plurality of conductors having a first end and a second end; a plurality of inverters, each inverter coupled to the first end of each conductor of the plurality of conductors; a storage circuit coupled to the second end of each conductor of the plurality of conductors; and a checker circuit coupled to the storage circuit, wherein an initial known bit pattern is provided to an input of the plurality of inverters, wherein an output of the plurality of inverters is provided to the storage circuit via the plurality of conductors, wherein the checker circuit determines if the output of the plurality of inverters stored in the storage circuit is an expected result, and wherein if the output is not the expected result, then the checker circuit provides an indication that a fault injection attack is occurring. The storage circuit may store the output of the plurality of inverters in response to a clock signal. Each inverter of the plurality of inverters may be configurable inverters. The known initial bit pattern may be provided only once at startup. The checker circuit may further include an exclusive-OR (XOR) logic gate for performing a bitwise XOR of each bit stored in the storage circuit with each bit of the known initial bit pattern, wherein an output of the XOR logic gate is compared to the expected result, and wherein if the output of the XOR is not equal to the expected result, the checker circuit providing the indication. The checker circuit may further include an exclusive-OR (XOR) logic gate for receiving a first input comprising a first comparison result of the known initial bit pattern with the output of the plurality of inverters and for receiving a second input comprising a second comparison result of an inverse of the initial known bit pattern with the output of the plurality of inverters, and wherein an output of the XOR logic gate is compared to the expected result to determine if the fault injection attack is occurring. The fault injection may include one or both of an increased clock frequency and a reduced power supply voltage.

In yet another embodiment, there is provided, a method for detecting a fault injection attack in an integrated circuit, the method including: providing a known initial value comprising a plurality of bits to a storage circuit; providing the initial value from the storage circuit to an input of an inverter to produce an inverted initial value; driving the inverted initial value onto a plurality of parallel conductors coupled to the storage circuit; storing a value in the storage circuit received from the plurality of parallel conductors; and determining that the fault injection attack has occurred when the stored value is not equal to an expected value. Storing a value in the storage circuit may further include storing a value in the storage circuit in response to a clock signal. The method may further include: performing a bitwise exclusive-OR (XOR) of each bit stored in the storage circuit with each bit of the known initial bit pattern; and comparing an output of the bitwise XOR with the expected result, and wherein if the output of the XOR is not equal to the expected result, providing an indication of the fault injection attack.

FIG. 1 illustrates a fault injection on a bus having three conductors 15-17 on an integrated circuit (IC) portion 10. For purposes of simplicity and clarity, the IC portion 10 shows only three conductors 15, 16, and 17 between circuit 12 and register 14. Circuit 12 and register 14 each receive a power supply voltage labeled "POWER SUPPLY" and a clock signal labeled "CLOCK". It is common for a circuit in an IC to perform a computation, and a result of the computation is saved in a register. Circuit 12 can be any type of circuit that performs a function on IC 10. Using the three conductors, circuit 12 transfers logic bits for storage in register 14. Note that in one embodiment, the three conductors may be part of a larger bus (not shown) including many conductors. Also, register 14 can be a portion of a register file used to store instructions, or register 14 may be a portion of any other type of memory circuit.

When circuit 12 transfers logic bits over conductors 15-17 to register 14, it takes a finite amount of time for the logic bits driven onto the conductors by circuit 12 to overdrive the logic states of the conductors from a previous transfer, which may have occurred on a previous clock cycle. For a plurality of relatively long conductors arranged in parallel relatively close to each other, a capacitive coupling between the conductors influences a time it takes for a transferred logic bit to transition from one logic state, such as a logic zero, to a logic one. It takes time to charge and discharge a voltage on a conductor. The amount of time it takes depends on many factors including the length of the conductors and the spacing of the conductors from each other. The speed of data transfer on a data bus also depends, at least in part, on the logic values (zeroes and ones) that are transferred. More precisely, as an example, when a conductor, such as a wire or a trace on an IC, is at a logic 1, or logic high state, represented by e.g., 1.8 volts, and circuit 12 attempts to drive a logic zero, or logic low state, represented by, e.g., 0 volts, it takes some time to change the state from the logical 1 voltage to the logical 0 voltage on a conductor. The same is true when circuit 12 attempts to drive a logic one onto a conductor that is at a logic zero. Two or more conductors that run near each other in parallel create a capacitance between them. When a signal on one of the conductors changes voltage states either to a high voltage or a low voltage, the amount of time it takes to change the voltage state of the conductor may be influenced by a voltage that is present on one or more neighboring conductors and by changes in voltage of the one or more neighboring conductors. The influence that the neighboring conductors have on each other depends in part on whether the conductors are both changing from the same state to another state, or from opposite states. That is, given two neighboring conductors, it is faster for both conductors to change their state from 0 to 1 at the same time, than it is for them to change to opposite states. The effect is more pronounced when a conductor changing state has a neighbor on both sides as illustrated in FIG. 1. In FIG. 1, conductors 15-17 are transferring a 3-bit value 010 from circuit 12 to register 14. The logic state of conductors 15-17 before time T0 is 101, respectively, possibly from a previous computation. That is, initially, conductors 15 and 17 are at a high voltage and conductor 16 is at a low voltage. The time required to transition voltage states is a time period between T0 and T1. Note that during the transition, there is a time between T0 and T1 when all three conductors are at a logic low voltage 000 because middle conductor 16 has not yet completely changed voltages due, in part, to the capacitive coupling on conductor 16 by conductors 15 and 17 changing their states in the opposite direction as mentioned above. The final 3-bit logic value 010 becomes available to register 14 after time T1. Note that the transition from one state to another occurs over time such that the transition has a slope that is not shown in FIG. 1.

In a data processing system, during normal operation, the frequency of a clock signal is determined, at least in part, by a maximum critical path delay. That is, the clock period is determined, at least in part, to be long enough so that the logic states on a critical signal path have time to transition from one logic state to another logic state under worse case conditions. A fault injection attack may cause the clock edge to arrive too soon between T0 and T1 by inserting a glitch or extra clock pulse as illustrated in FIG. 1 when the 3-bits are 000 and have not completed their logic state transitions. Register 14 will retain 3-bit value 000 (instead of 010) and subsequent computations of the IC that use the result stored in register 14 are likely to be incorrect.

Figure 2:
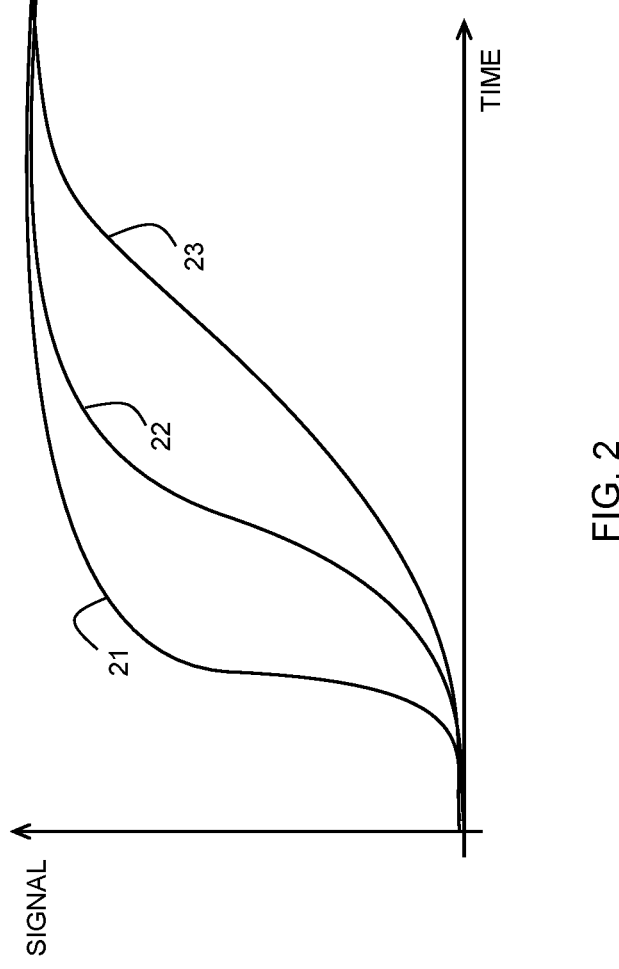
FIG. 2 illustrates a signal transition delay on a middle conductor of the three-conductor bus in FIG. 1.

FIG. 2 illustrates a signal transition delay on a middle conductor of the 3-conductors 15-17 in FIG. 1 for three scenarios. As can be seen in FIG. 1, conductor 16 is a middle conductor between conductors 15 and 17. Generally, when all 3 conductors 15-17 change their states to the same logic value, neighboring conductors 15 and 17 will "help" conductor 16 change state, e.g., all 3 conductors go from a low state to a high state so that the transition time of conductor 16 is relatively short as shown by curve 21 in FIG. 2. On the other hand, when one or both of neighboring conductors 15 and 17 change states in the opposite direction to conductor 16, they hinder each other from changing state. Curve 22 shows a relatively longer delay for conductor 16 when only one of conductors 15 or 17 changes state in the opposite direction from conductor 16. Curve 23 shows an even longer delay on conductor 16 when the logic states on both conductors 15 and 17 changes in opposite directions to conductor 16 (e.g., conductors 15 and 17 change their state from low state to high state and middle conductor 16 changes from high state to low state).

In case of a fault injection attack, the attacker can take advantage of this delay and deliberately change the clock frequency to make a clock edge arrive earlier than if the clock signal was from a normal clock to induce a fault in a computation as described above. Note that the difference in the time it takes a signal to be transferred on a bus might also be because of other factors. For example, some signals may require more computations and thus take more computation time before a signal is ready for transfer so that all the signals are not available at the same time. However, the capacitive coupling between conductors happens to signal transitions even if all signals are available for transmission on a bus at the same time.

Figure 3:
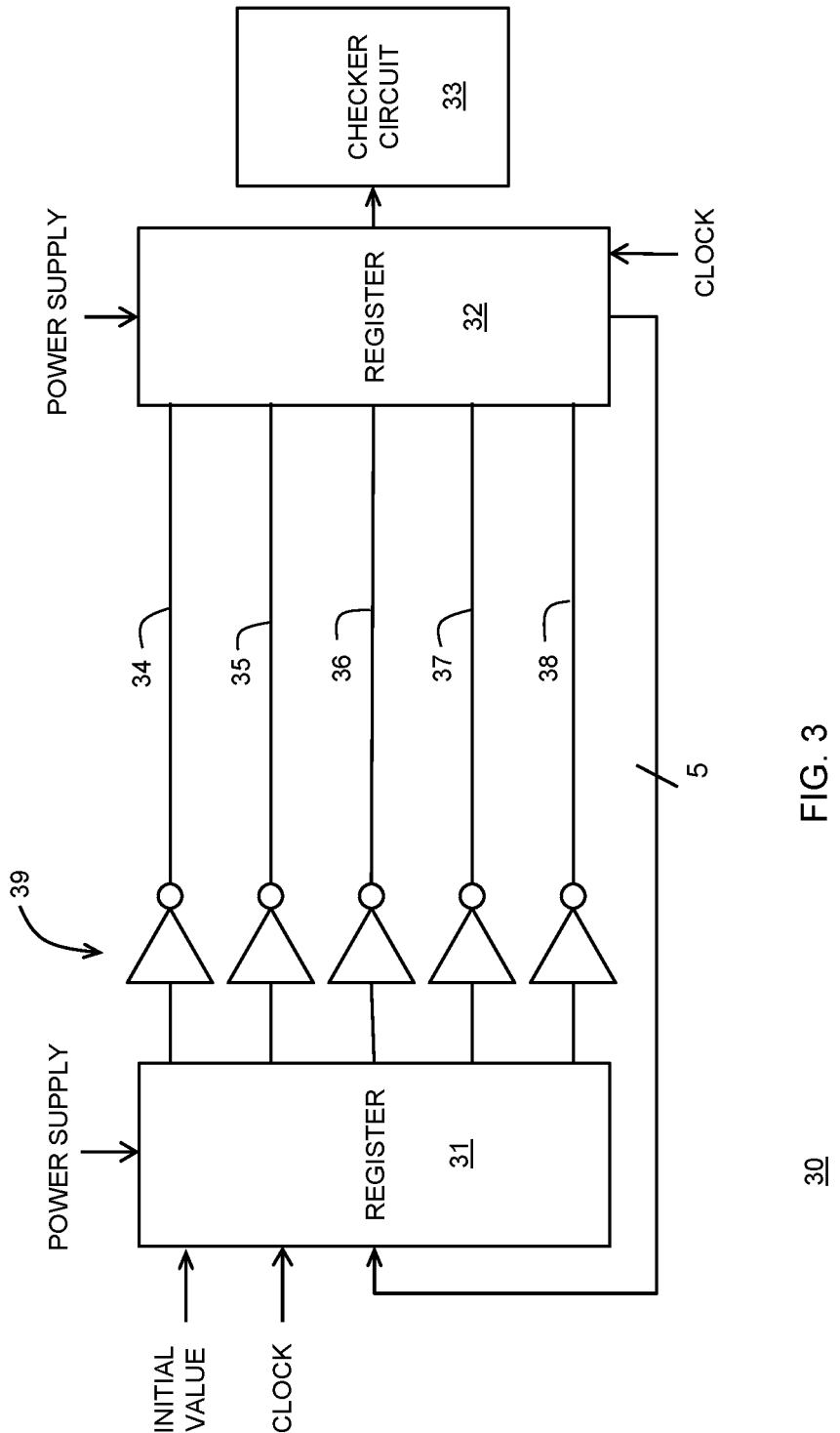
FIG. 3 illustrates a fault detection circuit in accordance with an embodiment.

FIG. 3 illustrates fault detection circuit 30 in accordance with an embodiment. Fault detection circuit 30 includes registers 31 and 32, checker circuit 33, a plurality of conductors 34-38 and a plurality of inverters 39. The plurality of inverters 39 are connected to register 31 and one end of conductors 34-38. The plurality of conductors 34-38 are connected to an output of inverters 39 for transferring signals from inverters 39 to register 32. Conductors 34-38 are arranged in parallel and relatively closely spaced. Also, conductors 34-38 should be as close to the same length as possible. In FIG. 3, an inverter, or NOT gate, of plurality of inverters 39 is coupled to a transmitting end of each of conductors 34-38. In other embodiments, other logic types may be substituted for plurality of inverters 39. The use of an inverter on each conductor provides a simple way to change the logic state on the conductors in the same way and with substantially the same amount of delay so that the inverter delay does not factor into the difference in delay on the conductors.

Checker circuit 33 is coupled to register 32. Each of registers 31 and 32 receives a power supply voltage labeled "POWER SUPPLY" and a clock signal labeled "CLOCK". Registers 31 and 32 can be any suitable type of storage circuit. Register 31 receives a known initial 5-bit value labeled "INITIAL VALUE". In one embodiment, fault detection circuit 30 is implemented in an IC as a standalone circuit block for detecting faults such as fault injection attacks directed at the IC. Fault detection circuit 30 operates independently of the other circuits on the IC and does not affect the operation of the other circuits.

As mentioned above, fault detection circuit 30 relies on capacitive coupling between each of conductors 34-38 to detect faults induced by a change of a clock frequency or drop in the supply voltage. For a circuit that does the actual computations, such as a circuit in a data processing system, the outcome of the computations is unknown, so it would be difficult to know if there was an error in the computation simply by looking at the result of the computation. Fault detection circuit 30 provides a known initial value (INITIAL VALUE) for computation with an expected result. The known initial value is a plurality of logic bits, one bit per conductor, that is chosen to provide a logic transition of a predetermined time. The initial value is inverted, provided to the conductors, and the result of the transition on the plurality of conductors is compared with the expected value to detect if a fault was injected during the computations.

Fault detection circuit 30 is based on a data bus with 5 parallel conductors 34-38, but other types and sizes of data buses are possible. To detect faults, register 31 is initialized with known initial value (INITIAL VALUE). As an example, register 31 is initialized with bit pattern 00100 and provided to plurality of inverters 39 at a first end of conductors 34-38 in response to a clock signal provided at the CLOCK terminal. After being inverted by inverters 39, bit pattern 11011 is transferred over the conductors to the second end and stored in register 32 in response to clock signal CLOCK. There is a return path from register 32 back to register 31. Note that the known initial value (INITIAL VALUE) is provided only once, which may be at startup or reset or in response to some occurrence. On every clock cycle at the output of inverters 39, the bit pattern on conductors 34-38 between the output of inverters 39 and register 32 switch states from initial value 00100 to 11011, back to 00100 and again to 11011 repeatedly if no fault is injected. Moreover, each conductor will switch its state from 0 to 1 or from 1 to 0. The initial value in this example is chosen so that middle conductor 36 of conductors 34-38 always transfers a bit value that is different from all others (e.g., the bit 0 in 11011). That means that middle conductor 36 at the output of the respective inverter of inverters 39 will switch in the opposite direction compared to the other conductors 34, 35, 37, and 38. For example, when the pattern switches from 00100 to 11011, middle conductor 36 makes the transition from high state (1) to low state (0) while all the other conductors 34, 35, 37, and 38 will switch from low state (0) to the high state (1). In this example, the logic state on middle conductor 36 will transition from the 1 state to the 0 state later than the logic state on conductors 34, 35, 37, and 38 transition in the opposite direction because of capacitive coupling as described above. If an attacker uses a fault injection by, e.g., reducing the supply voltage or increasing the clock frequency, then the information on middle conductor 36 may not have enough time to transition states before, e.g., an extra edge of the clock signal, captures the wrong value in register 32 and the new value will not be of the form 00100 or 11011. Note that middle conductor 36 was used as an example and logic state changes on any of the other conductors may be suitable for fault detection as described depending on the desired length of the transition time. Checker circuit 33 compares the stored values in register 32 to the expected value to detect that a fault injection has occurred. Details of embodiments of checker circuit 33 are described below and shown in FIG. 6, FIG. 7, and FIG. 8.

Figure 4:
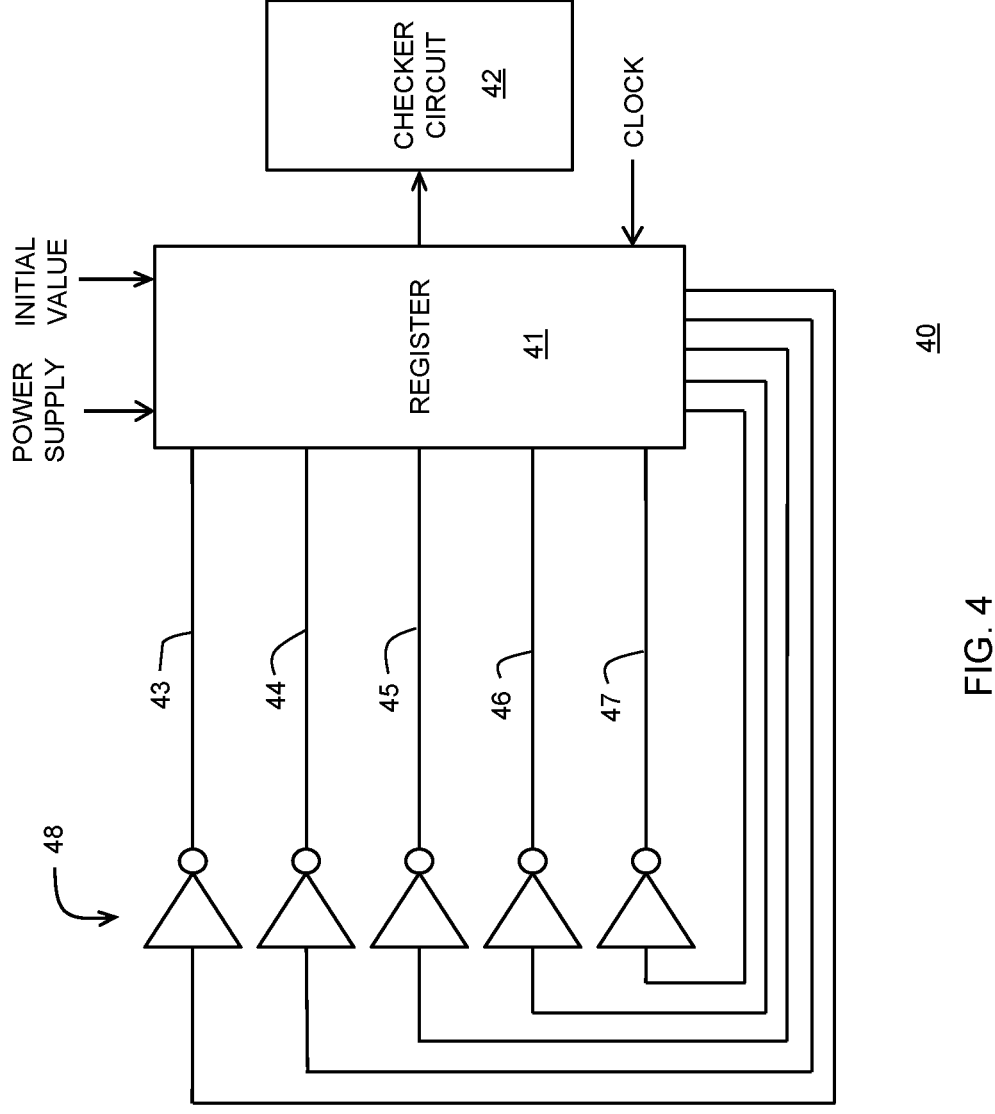
FIG. 4 illustrates a fault detection circuit in accordance with another embodiment.

FIG. 4 illustrates fault detection circuit 40 in accordance with another embodiment. Fault detection circuit 40 includes register 41, checker circuit 42, conductors 43-47, and inverters 48. Fault detection circuit 40 operates similarly to fault detection circuit 30, except that fault detection circuit 40 only has one register 41. Register 41 receives a known initial value (INITIAL VALUE) as described above and the bits are changed on every clock cycle of clock signal CLOCK by inverters 48. Note that in the embodiment illustrated in FIG. 4, it is important that the conductors are all the same length, even from the output of register 41 to the input of inverters 48 because they become part of the transition delay.

Figure 5:
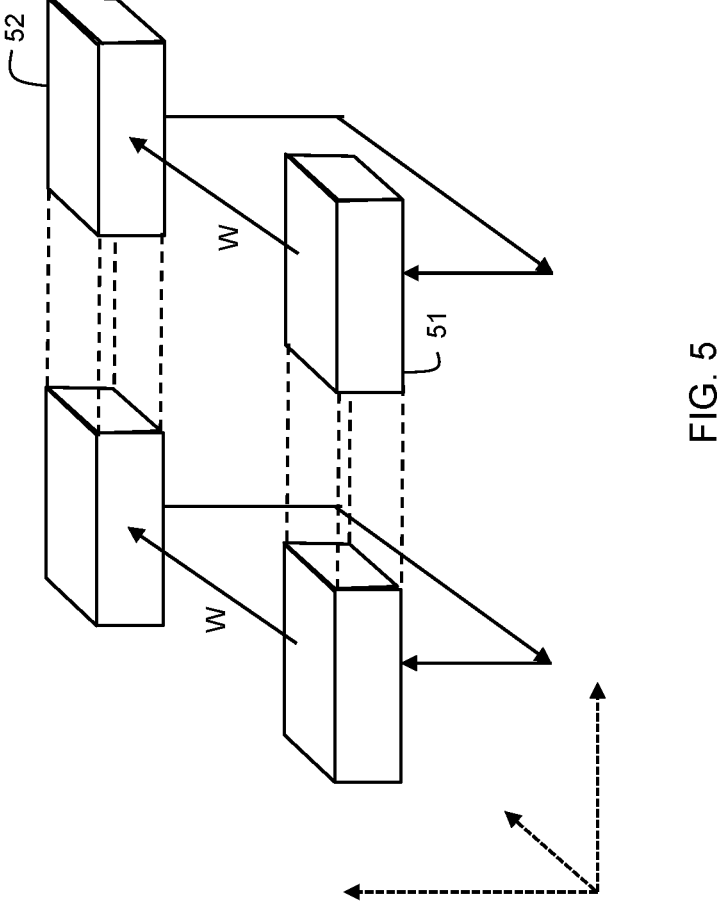
FIG. 5 illustrates a three-dimensional view of two parallel conductors.

FIG. 5 illustrates a three-dimensional view of a portion of two parallel conductors 51 and 52. It is important to tune the system in a way that the time between T0 and T1, shown in FIG. 1, is closely related to the time that is needed for the computation or execution of the critical path of the chip. The critical path is the longest computational path of the hardware design of a data processing system, and it determines the maximum clock frequency that can be used for a circuit given a chosen power supply voltage. When a new circuit is designed the critical path is often one of the most important elements since a longer critical path will make the circuit run slower (i.e., will not allow use of a clock with high frequency). Note, it is important that conductors that constitute the data bus and transport the signals have the same length. Otherwise, the length of the conductors would have to be considered in the computation of the time delay which can be difficult and will make the circuitry more complex.

The length of the time delay between T0 and T1 caused by capacitive coupling depends on the physical properties of conductors such as distance (W) between the parallel conductors, composition of the conductors, surrounding materials and objects, voltage on the conductors as well as the size and shape of the conductors. An important point is that the logic states on the conductors that both change and don't change also influence the delay. For example, a change from 000 to 111 may result in negligible delay, the change from 010 to 101 may have a large delay and a change from 100 to 011 will likely have an intermediate delay. This is due, at least in part, because of the capacitive coupling, or "crosstalk" between conductors. The crosstalk happens between neighboring conductors but also happens between conductors of a data bus that are further apart from each other (2nd neighbor, 3rd neighbor, etc.). The delay produced by capacitive coupling in such case is smaller but still occurs. Note that the conductors may be traces on an IC die, board traces on a printed circuit board (PCB), wires, or other types of conductors. Also, the conductors may be formed from various metals such as copper, aluminum, metal alloys, semiconductive materials like polysilicon, and the like.

Figure 6:
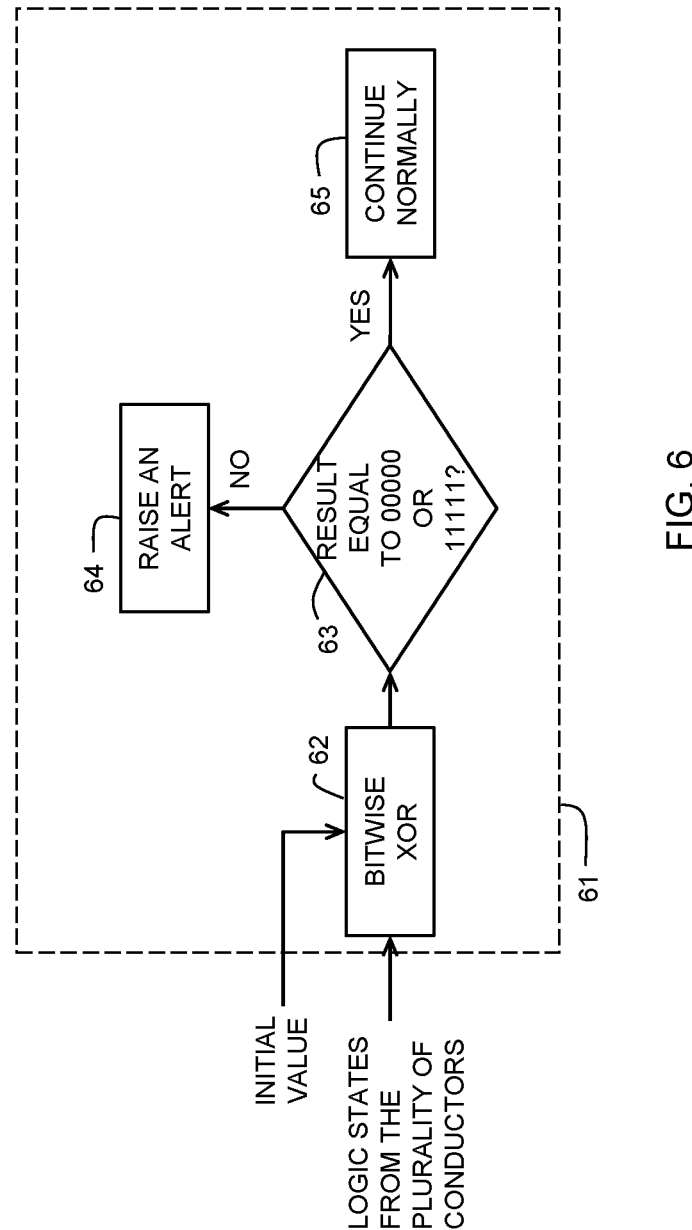
FIG. 6 illustrates a flowchart for a method of detecting a fault in accordance with an embodiment.
Figure 9:
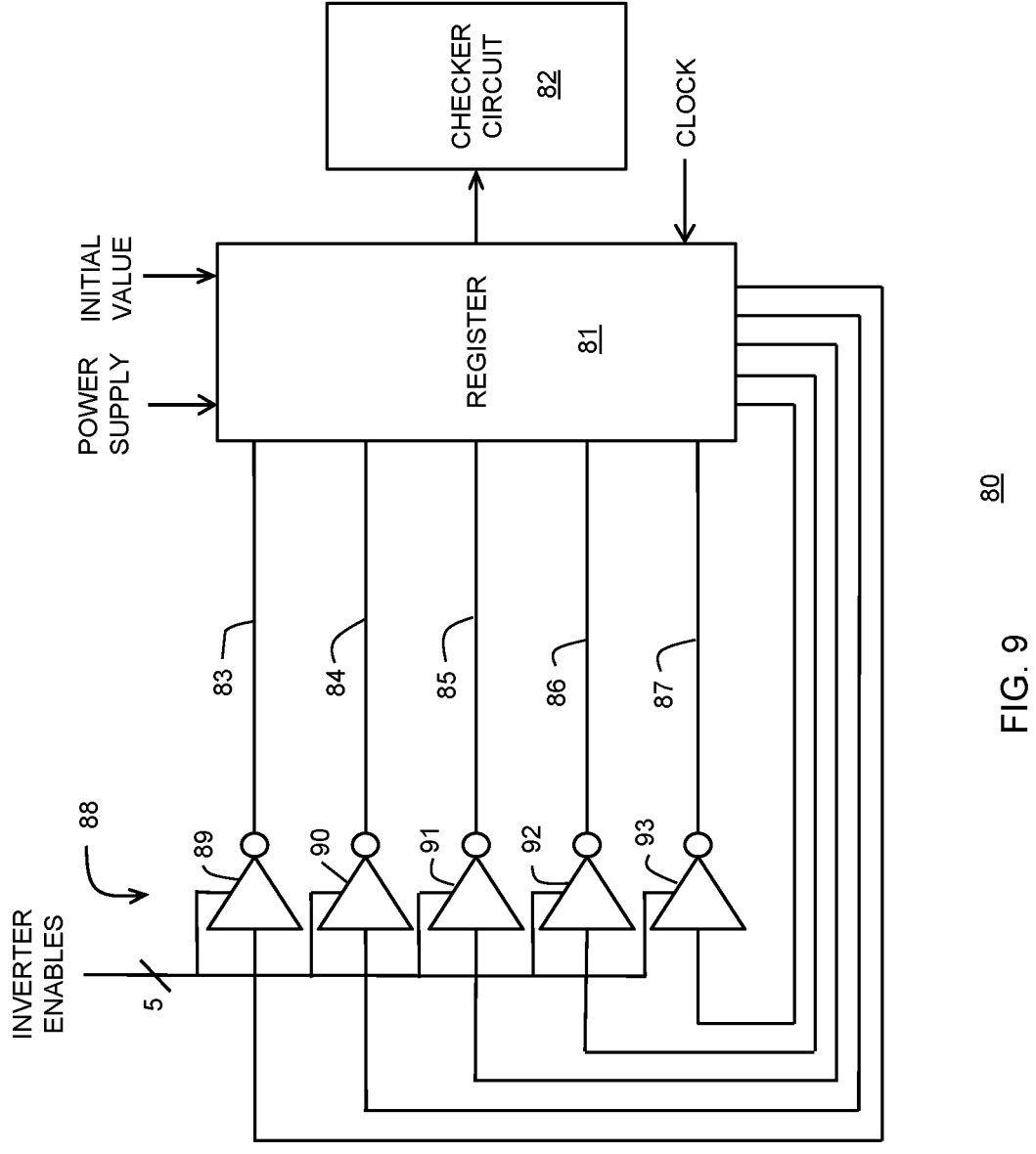
FIG. 9 illustrates a fault detection circuit having configurable inverters in accordance with an embodiment.

FIG. 6 illustrates a flowchart for a method performed in checker circuit 61 for use in the fault detection circuits of FIG. 3, FIG. 4, and FIG. 9. In the method, bitwise XOR logic gate 62 is coupled to receive a bit value from a plurality of conductors, such as plurality of conductors 34-38 or plurality of conductors 43-47 of FIG. 3 or FIG. 4, respectively, and a known initial value. Using the example described above for a 5-bit value, the initial value may be 00100. On every clock cycle there can be only 2 possible values in a register, such as register 32 or 41, either the initial bit value 00100 or its inverse 11011. The expected result after bitwise XOR 62 is either bit values 00000 or 11111. Decision block 63 determines if the output of bitwise XOR 62 is one of those two values, or a different bit value. If the result is 00000 or 11111, then no fault has been detected and operation of the IC continues normally at block 65. However, if the result is not equal to 00000 or 11111, then a fault is detected, and an indication of the fault is provided as shown in block 64. At this point, corrective action may be taken, such as to reset or restart the IC.

Figure 7:
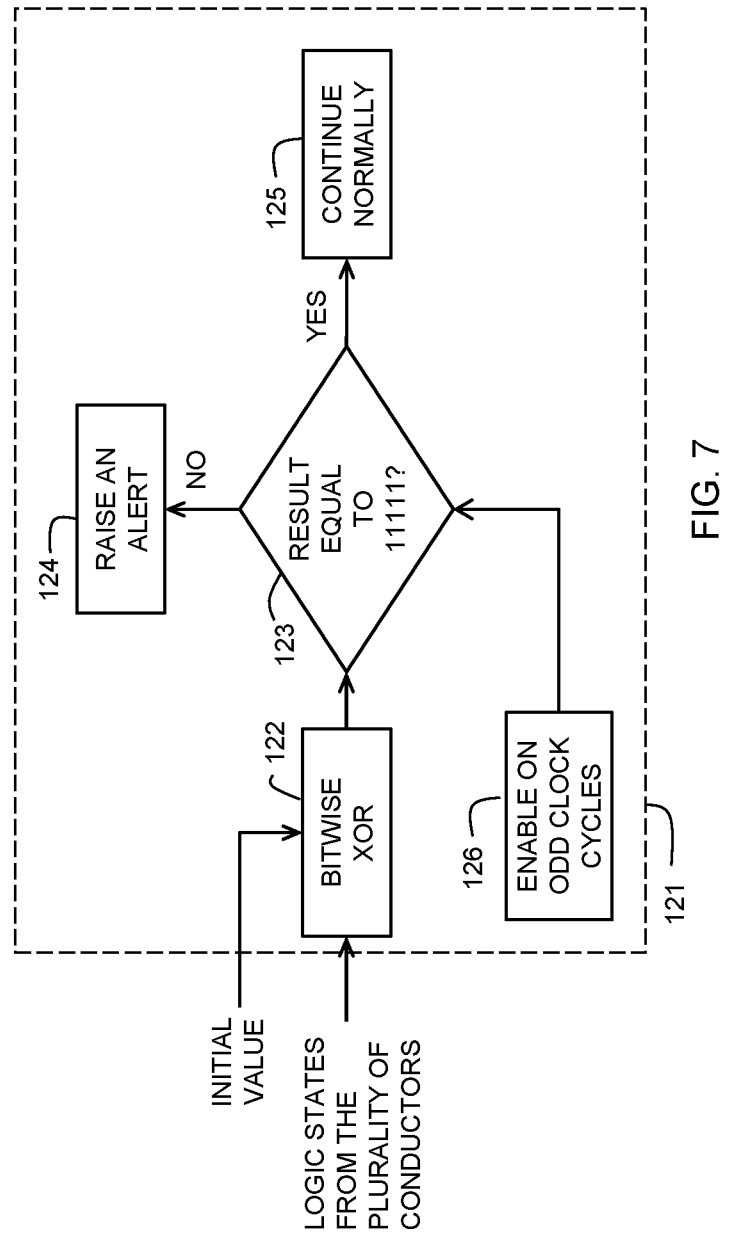
FIG. 7 illustrates a flowchart of a method for detecting a fault in accordance with another embodiment.

FIG. 7 illustrates a flowchart of a method for detecting a fault in accordance with another embodiment. The method is performed according to a checker circuit 121. Checker circuit 121 may be used in any of the fault detections circuit disclosed in FIG. 3, FIG. 4, and FIG. 9. In the method, bitwise XOR logic gates 122 are coupled to receive a bit value from a plurality of conductors, such as plurality of conductors 34-38 or plurality of conductors 43-47 of FIG. 3 or FIG. 4 respectively. Bitwise XOR logic gates 122 also receives the known initial bit value (INTIAL VALUE). Note that INITIAL VALUE and the plurality of conductors each include the same number of bits, e.g., 5-bits. Using the same initial value of 00100, as described above regarding the fault detection circuits of FIG. 3 and FIG. 4, on every clock cycle of the fault detection circuit, there can be only 2 possible values in a register, such as register 32 or 41, either the initial bit value 00100 or its inverse 11011. Decision block 123 is enabled to determine a result of bitwise XOR gates 122 only on odd clock cycles of the fault detection circuit, as provided by enable block 126. The expected result after bitwise XOR 122 on odd clock cycles is bit values 11111. Decision block 123 determines if the output of bitwise XOR logic gates 122 is bit value 11111, or a different bit value. If the result is 11111, then no fault has been detected and operation of the IC continues normally at block 125. However, if the result is not equal to 11111, then a fault is detected, and an indication of the fault is provided as shown in block 124. At this point, corrective action may be taken, such as to reset or restart the IC.

Figure 8:
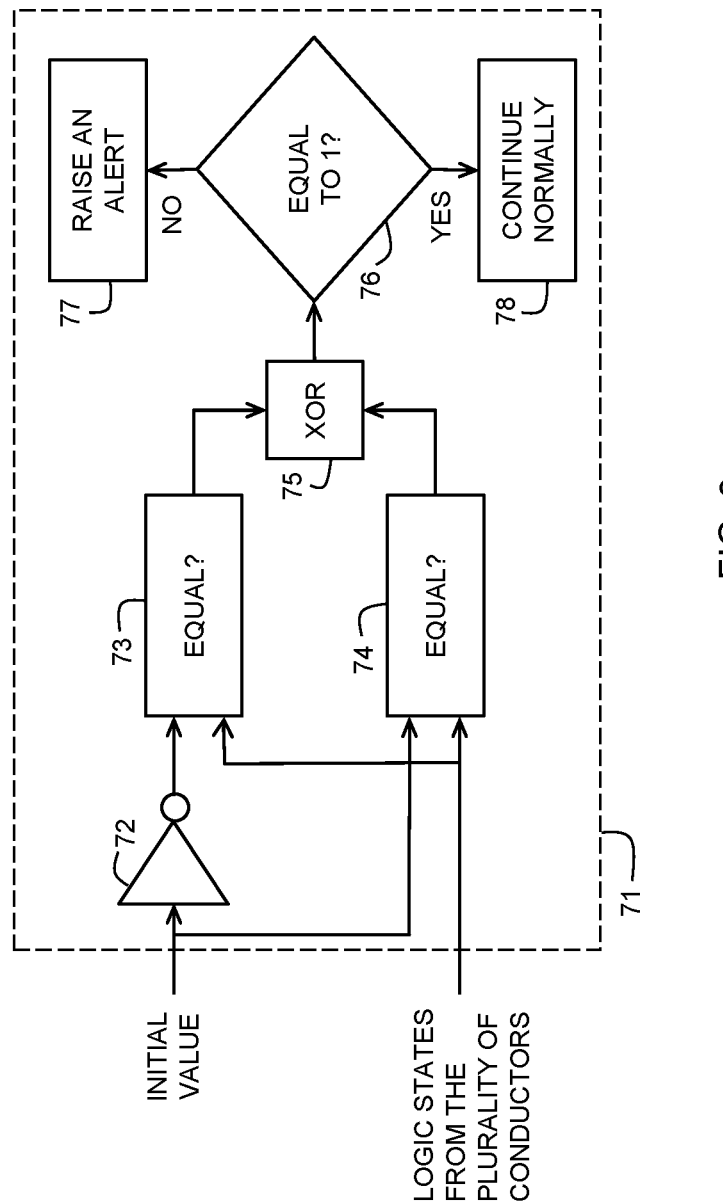
FIG. 8 illustrates a flowchart of a method for detecting a fault in accordance with another embodiment.

FIG. 8 illustrates a flowchart of a method performed with checker circuit 71 for detecting a fault in accordance with another embodiment. Checker circuit 71 may be used in checker circuits 33, 41, and 82 of fault detection circuits 30, 40, and 80, respectively, of FIG. 3, FIG. 4, and FIG. 9. Checker circuit 71 checks if the value from the plurality of conductors, such as plurality of conductors 34-38 or plurality of conductors 43-47 of FIG. 3 or FIG. 4, respectively, is equal to the known initial value or its inverse (bitwise application of a NOT gate). Checker circuit 71 is enabled on every second clock cycle of clock signal clock. Thus, the value on the plurality of conductors from FIG. 3 or FIG. 4 will be equal to the known initial value, then to its inverse and then again to the initial value after being inverted twice. Checker circuit 71 will only perform the check on odd clock cycles (first clock cycle, third clock cycle, fifth clock cycle, etc.). Such approach can make checker circuit 71 simpler but will make the fault detection slower by one clock cycle.

Fault detection circuits 30, 40, and 80 should be parametrized so that the time between T0 and T1 is as close as possible to the time required by the critical path of the circuit without being shorter. Several different parameters of the fault detection circuit can be changed to adjust the time between T0 and T1. For example, the materials of the conductors composing the data bus can be chosen to change the timing. The properties of materials surrounding the conductors of the data bus, will also contribute to the "strength" of the capacitive coupling between the wires of the data bus.

The shape of the conductors, their length, thickness and physical proximity to each other will influence the amount of capacitive coupling between them. Also, the distance between the conductors and the path the conductors take across, e.g., a semiconductor die affects the amount of capacitive coupling. For example, if parallel conductors are very far from one another there will be less coupling and thus less influence between them when changing states. The voltage of the circuit will also play an important role on the time between T0 and T1 (FIG. 1). For example, a higher voltage will allow signals to transition faster, reducing the time between T0 and T1 for an attacker to inject a fault. Also, as mentioned above, the bit pattern that is being transferred on a data bus at the same time and the number of 0-bits and 1-bits that are transferred will affect the time between T0 and T1. The bit pattern being transferred is the only parameter that can be changed later in software. Generally, all the parameters except the known initial value are fixed once the device is manufactured. However, because of process variations, temperature changes, and other uncontrollable parts of the chip design, there may be small variations in the physical properties across a family of devices. Thus, there should be a margin for small differences in the time between T0 and T1 in different devices. To adjust the final delay and timing, the pattern that is used to initialize the circuit can be tuned by choosing a bit pattern that provides the desired delay. For example, on a 5-bit bus using one of the fault detection circuits of FIG. 3, FIG. 4, or FIG. 9, an initial value (INITIAL VALUE) may be 00100 which, when inverted is 11011, for providing a larger delay. An initial value of, e.g., 00110, which inverts to 11001, may be used for a slightly smaller delay. Other patterns may provide different delays.

In general, as mentioned above, a conductor having adjacent conductors with a different bit value will increase the transition delay of the conductor, and adjacent conductors with the same bit value will reduce the transition delay. Moreover, adjacent conductors that are far away from each other will have less effect than adjacent conductors that are relatively closer to each other. A larger data bus with more conductors will give more flexibility for adjusting the transition delays in software once the IC is already produced, i.e., more parallel conductors provide more possible configurations for patterns.

Some modern data processors such as microcontrollers can work with multiple clock frequencies and multiple input voltages. Usually, this feature is used for providing energy savings, e.g., for low power modes. If the fault detection circuit is implemented in an IC that has multiple clock frequency and power supply voltages, multiple fault detection circuits such as those described herein having different transition delays, e.g., longer or shorter data buses or with smaller and larger distances between the wires of the data bus can be implemented for each frequency and/or power supply. This way at least one of the fault detection circuits will correspond to one or several possible power supply voltages and/or clock frequency attacks. Each of the fault detection circuits can still be tuned using specific data patterns as mentioned above. So, when the device changes its working frequency, it can also enable another fault detection circuit and configure it with a chosen bit pattern.

Figure 10:
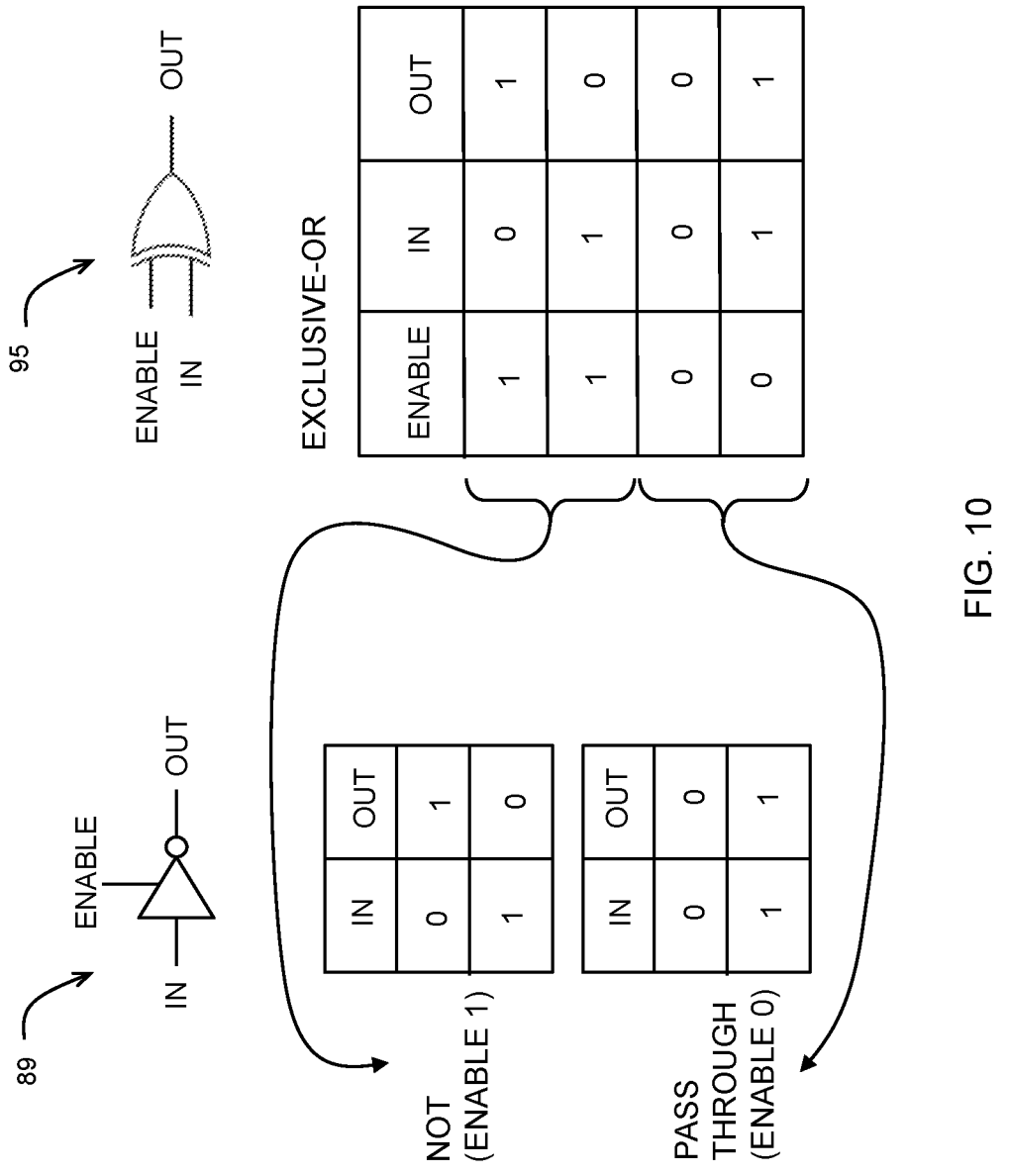
FIG. 10 illustrates an example configurable inverter implemented using an exclusive-OR (XOR) gate.

FIG. 9 illustrates fault detection circuit 80 having configurable inverters 88 in accordance with an embodiment. Fault detection circuit 80 includes register 81, checker circuit 82, conductors 83-87, and plurality of configurable inverters 88. As can be seen, fault detection circuit 80 is the same as fault detection circuit 40 except that plurality of inverters 48 are substituted with plurality of configurable inverters 88. Plurality of configurable inverters 88 includes configurable inverters 89-93. The enable terminals of each of the inverters 89-93 receives one of enable signals labeled "INVERTER ENABLES". When enabled, a configurable inverter operates as a normal inverter. When disabled, configurable inverter functions like an enabled transmission gate and passes a signal with a logic state through to the other side of the configurable inverter. The configurable inverters 88 allows more flexibility in adjusting the delay between times T0 and T1 (FIG. 1) and provides more software options for timing adjustment. Time delays between T0 and T1 can be changed if one of the neighboring conductors in a data bus does not change its value. Plurality of configurable inverters 88 makes it possible for some of the inverters to be disabled depending on the software configuration. FIG. 10 provides one way a configurable inverter can be implemented using an XOR gate. Checker circuit 82 may be implemented as described above regarding FIG. 6 and FIG. 7.

FIG. 10 illustrates a configurable inverter implemented using an exclusive-OR (XOR) gate. There are also other ways to implement a configurable inverter. A truth table for configurable inverter 89 is provided below configurable inverter 89. An inverter function of configurable inverter 89 is enabled when enable signal ENABLE is a logic 1 as shown. A pass-through function is enabled when enable signal ENABLE is a logic 0. Accompanying truth tables are provided for each function. Regarding XOR gate 95, one of the inputs is a normal input IN and the other input is an enable input ENABLE. The truth table for XOR gate 95 is provided. Using this approach with fault detection circuit 80 in FIG. 9, a bit pattern such as, e.g., 00100, where the underlined bit does not change, provides 11001 on conductors 83-87, respectively, when configurable inverter 92 is providing the pass-through function. As can be seen in this example, the fourth bit from inverter 86 is passed through without changing the logic state, and thus the middle bit from inverter 91 is not influenced as much and therefore needs less time for the logic state on conductor 85 to transition.

Figure 11:
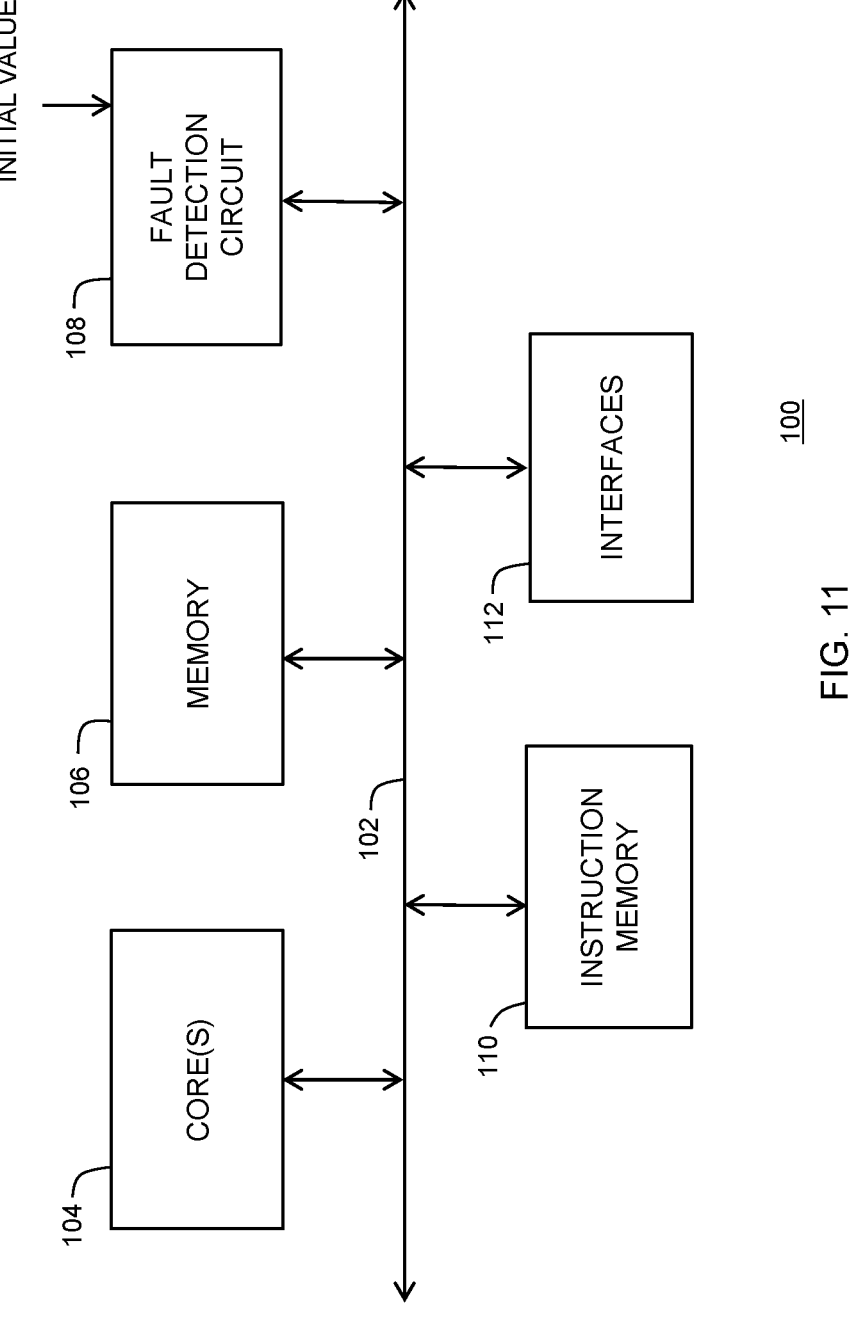
FIG. 11 illustrates a data processing system including a fault injection detection circuit in accordance with an embodiment of an IC.

FIG. 11 illustrates a data processing system 100 including a fault injection detection circuit in accordance with an embodiment. Data processing system 100 may be implemented using one or more integrated circuits and may be used in an implementation of the described embodiments. Data processing system 100 includes data bus or switching network 102 useful for communicating information between circuits of data processing system 100. In one example, data processing system 100 may be a system on a chip (SoC). In another embodiment, data processing system 100 may include multiple integrated circuits (ICs), also known as chips. Connected to bus 102 is one or more processor cores 104, memory 106, fault detection circuit 108, instruction memory 110, and interfaces 112. The one or more processor cores 104 may include any hardware device capable of executing instructions stored in memory 106 or instruction memory 110. For example, processor cores 104 may execute encryption and/or decryption algorithms in the illustrated embodiment. Processor cores 104 may be, for example, a microprocessor, field programmable gate array (FPGA), application-specific integrated circuit (ASIC), or similar device. Processor cores 104 may be implemented in a secure hardware element and may be tamper resistant.

Memory 106 may be any kind of memory, such as for example, L1, L2, or L3 cache or system memory. Memory 106 may include volatile memory such as static random-access memory (SRAM) or dynamic RAM (DRAM), or may include non-volatile memory such as flash memory, read only memory (ROM), or other volatile or non-volatile memory. Also, memory 106 may be implemented in a secure hardware element or other type of secure storage. Alternately, memory 106 may be a hard drive implemented externally to data processing system 100. Memory 106 may be used to store software for running a fault detection circuit according to the described embodiments. Also, a portion of memory 106 may be used to store the logic bit pattern INITIAL VALUE and the alternating register values when a fault detection circuit such as described herein is used to determine a crosstalk delay.

Fault detection circuit 108 may be any fault detection circuit according any of the described embodiments in FIGS. 3, 4, and 9.

Instruction memory 110 may include one or more non-transient machine-readable storage media for storing instructions for execution by processor cores 104. In other embodiments, both memories 106 and 110 may store data upon which processor cores 104 may operate. Memories 106 and 110 may also store, for example, encryption, decryption, and verification applications. Memories 106 and 110 may be implemented in a secure hardware element and be tamper resistant.

Interfaces 112 may be connected to one or more circuits for enabling communication with a user such as an administrator or with a network. Interfaces 112 may include user interfaces for coupling to a display, a mouse, a keyboard, or other input/output device. Interfaces 112 may include one or more circuits for enabling communication with other hardware devices. For example, interfaces 112 may include, or be coupled to, a network interface card (NIC) configured to communicate according to the Ethernet protocol. Also, interfaces 112 may implement a TCP/IP stack for communication according to the TCP/IP protocols. Data samples for classification may be input via interfaces 76. Various other hardware or configurations for communicating are available.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The terms "circuit" and "circuitry" may refer to hardware, software, or a combination of hardware and software.

Unless stated otherwise, terms such as "first" and "second" are used to arbitrarily distinguish between the elements such terms describe. Thus, these terms are not necessarily intended to indicate temporal or other prioritization of such elements. The term "coupled," as used herein, is not intended to be limited to a direct coupling or a mechanical coupling.

What is claimed is:

1. A fault detection circuit in an integrated circuit, the fault detection circuit comprising:

a plurality of conductors arranged in parallel, wherein each conductor of the plurality of conductors has a first end and a second end, and wherein the plurality of conductors is configured to produce a plurality of output bits at the second ends of the plurality of conductors;

a plurality of logic gates with a plurality of inputs and a plurality of outputs, wherein a different output of each of the plurality of outputs of the logic gates is coupled to the first end of a different conductor of each of the plurality of conductors, wherein each input of the plurality of inputs of the logic gates is configured to receive a different input bit of an input bit pattern, and wherein the plurality of outputs of the plurality of logic gates is configured to produce a modified bit pattern at the first ends of the plurality of conductors;

a storage circuit coupled to the second end of each conductor of the plurality of conductors, wherein the storage circuit is configured to store the plurality of output bits produced at the second ends of the plurality of conductors as a stored bit pattern;

a checker circuit coupled to the storage circuit, wherein the checker circuit determines if the stored bit pattern stored in the storage circuit equals the modified bit pattern, and wherein if the stored bit pattern is not equal to the modified bit pattern, then the checker circuit provides an indication that a fault injection attack is occurring; and a return path from the storage circuit to the plurality of inputs of the plurality of logic gates, wherein the stored bit pattern is provided over the return path to the plurality of inputs of the plurality of logic gates for a next iteration.

2. The fault detection circuit of claim 1, wherein the storage circuit is a register.

3. The fault detection circuit of claim 1, wherein the storage circuit stores the stored bit pattern in response to a clock signal.

4. The fault detection circuit of claim 1, wherein the plurality of logic gates are inverters.

5. The fault detection circuit of claim 4, wherein each logic gate of the plurality of logic gates is a configurable inverter.

6. The fault detection circuit of claim 1, wherein a known initial bit pattern is provided only once at startup of the integrated circuit, and wherein the input bit pattern is the known initial bit pattern at the startup.

7. The fault detection circuit of claim 1, wherein the fault injection comprises one or both of an increased clock frequency and a reduced power supply voltage.

8. The fault detection circuit of claim 1, wherein the input bit pattern has one or more first bits with a first bit value and one or more second bits with a second bit value that is different from the first bit value, and wherein the one or more first bits of the input bit pattern include a middle bit with the first bit value.

9. The fault detection circuit of claim 1, wherein the plurality of conductors are arranged relatively closely so that neighboring conductors of the plurality of conductors experience capacitive coupling.

10. A fault detection circuit in an integrated circuit, the fault detection circuit comprising:

a plurality of conductors arranged in parallel, wherein each conductor of the plurality of conductors has a first end and a second end, and wherein the plurality of conductors is configured to produce a plurality of output bits at the second ends of the plurality of conductors;

a plurality of logic gates with a plurality of inputs and a plurality of outputs, wherein a different output of each of the plurality of outputs of the logic gates is coupled to the first end of a different conductor of each of the plurality of conductors, wherein a known initial bit pattern is provided only once at startup of the integrated circuit, wherein an input bit pattern is the known initial bit pattern at the startup, wherein each input of the plurality of inputs of the logic gates is configured to receive a different input bit of the input bit pattern, and wherein the plurality of outputs of the plurality of logic gates is configured to produce a modified bit pattern at the first ends of the plurality of conductors;

a storage circuit coupled to the second end of each conductor of the plurality of conductors, wherein the storage circuit is configured to store the plurality of output bits produced at the second ends of the plurality of conductors as a stored bit pattern; and a checker circuit coupled to the storage circuit, wherein the checker circuit includes an exclusive-OR (XOR) logic gate for performing a bitwise XOR of each bit of the stored bit pattern stored in the storage circuit with each bit of the known initial bit pattern, wherein the checker circuit determines if the stored bit pattern stored in the storage circuit equals the modified bit pattern by comparing an output of the XOR logic gate to an expected result, and wherein if the stored bit pattern is not equal to the modified bit pattern, which occurs if the output of the XOR logic gate is not equal to the expected result, then the checker circuit provides an indication that a fault injection attack is occurring.

11. The fault detection circuit of claim 10, wherein the expected result is a bit pattern of all zeros or a bit pattern of all ones.

12. A fault detection circuit in an integrated circuit, the fault detection circuit comprising:

a plurality of conductors arranged in parallel, wherein each conductor of the plurality of conductors has a first end and a second end, and wherein the plurality of conductors is configured to produce a plurality of output bits at the second ends of the plurality of conductors;

a plurality of logic gates with a plurality of inputs and a plurality of outputs, wherein a different output of each of the plurality of outputs of the logic gates is coupled to the first end of a different conductor of each of the plurality of conductors, wherein a known initial bit pattern is provided only once at startup of the integrated circuit, wherein an input bit pattern is the known initial bit pattern at the startup, wherein each input of the plurality of inputs of the logic gates is configured to receive a different input bit of the input bit pattern, and wherein the plurality of outputs of the plurality of logic gates is configured to produce a modified bit pattern at the first ends of the plurality of conductors;

a storage circuit coupled to the second end of each conductor of the plurality of conductors, wherein the storage circuit is configured to store the plurality of output bits produced at the second ends of the plurality of conductors as a stored bit pattern; and a checker circuit coupled to the storage circuit, wherein the checker circuit includes an exclusive-OR (XOR) logic gate for receiving a first input comprising a first comparison result of the known initial bit pattern with the stored bit pattern and a second input comprising a second comparison result of an inverse of the known initial bit pattern with the stored bit pattern, wherein the checker circuit determines if the stored bit pattern stored in the storage circuit equals the modified bit pattern by comparing an output of the XOR logic gate to an expected result to determine if a fault injection attack is occurring, and wherein if the stored bit pattern is not equal to the modified bit pattern, then the checker circuit provides an indication that the fault injection attack is occurring.

13. The fault detection circuit of claim 12, wherein when the output of the XOR logic gate equals the expected result, the checker circuit determines that the fault injection attack is not occurring, and when the output of the XOR logic gate does not equal the expected result, the checker circuit determines that the fault injection attack is occurring.

14. An integrated circuit, comprising:

circuitry for performing a function; and a fault detection circuit comprising:

a plurality of conductors arranged in parallel, wherein each conductor of the plurality of conductors has a first end and a second end, and wherein the plurality of conductors is configured to produce a plurality of output bits at the second ends of the plurality of conductors;

a plurality of inverters with a plurality of inputs and a plurality of outputs, wherein a different output of each of the plurality of outputs of the inverters is coupled to the first end of a different conductor of each of the plurality of conductors, wherein each input of the plurality of inputs of the inverters is configured to receive a different input bit of an input bit pattern, and wherein the plurality of outputs of the plurality of inverters is configured to produce a modified bit pattern at the first ends of the plurality of conductors;

a storage circuit coupled to the second end of each conductor of the plurality of conductors, wherein the storage circuit is configured to store the plurality of output bits produced at the second ends of the plurality of conductors as a stored bit pattern;

a checker circuit coupled to the storage circuit, wherein the checker circuit determines if the stored bit pattern stored in the storage circuit equals the modified bit pattern, and wherein if the stored bit pattern is not equal to the modified bit pattern, then the checker circuit provides an indication that a fault injection attack is occurring; and a return path from the storage circuit to the plurality of inputs of the plurality of logic gates, wherein the stored bit pattern is provided over the return path to the plurality of inputs of the plurality of logic gates for a next iteration.

15. The integrated circuit of claim 14, wherein the storage circuit stores the stored bit pattern in response to a clock signal.

16. The integrated circuit of claim 14, wherein each inverter of the plurality of inverters is a configurable inverter.

17. The integrated circuit of claim 14, wherein a known initial bit pattern is provided only once at startup of the integrated circuit, and wherein the input bit pattern is the known initial bit pattern at the startup.

18. The integrated circuit of claim 17, wherein the checker circuit further comprises an exclusive-OR (XOR) logic gate for performing a bitwise XOR of each bit of the stored bit pattern stored in the storage circuit with each bit of the known initial bit pattern, wherein an output of the XOR logic gate is compared to an expected result, and wherein if the output of the XOR logic gate is not equal to the expected result, the checker circuit providing the indication.

19. The integrated circuit of claim 14, wherein the checker circuit further comprises an exclusive-OR (XOR) logic gate for receiving a first input comprising a first comparison result of the known initial bit pattern with the stored bit pattern and a second input comprising a second comparison result of an inverse of the known initial bit pattern with the stored bit pattern, and wherein an output of the XOR logic gate is compared to an expected result to determine if the fault injection attack is occurring.

* * * * *